United States Patent
Chun et al.

(10) Patent No.: US 9,079,718 B2
(45) Date of Patent: Jul. 14, 2015

(54) RAIL SYSTEM FOR THERMOFORMER WITH DUAL MOTOR CHAIN DRIVE

(71) Applicants: Victor Chun, Midland, MI (US); James Martin, Beaverton, MI (US); Steve Keeley, Clare, MI (US); Keith Redburn, Beaverton, MI (US); Phil Eichbauer, St. Louis, MI (US)

(72) Inventors: Victor Chun, Midland, MI (US); James Martin, Beaverton, MI (US); Steve Keeley, Clare, MI (US); Keith Redburn, Beaverton, MI (US); Phil Eichbauer, St. Louis, MI (US)

(73) Assignee: Brown Machine, LLC, Beaverton, MI (US)

(*) Notice: Subject to any disclaimer, the term of this patent is extended or adjusted under 35 U.S.C. 154(b) by 214 days.

(21) Appl. No.: 13/856,629

(22) Filed: Apr. 4, 2013

(65) Prior Publication Data
US 2014/0133940 A1    May 15, 2014

Related U.S. Application Data

(60) Provisional application No. 61/686,386, filed on Apr. 4, 2012.

(51) Int. Cl.
- B65G 17/08    (2006.01)
- F27D 3/00    (2006.01)
- B21D 19/12    (2006.01)
- B21D 51/26    (2006.01)
- B31B 1/00    (2006.01)

(52) U.S. Cl.
CPC ............... *B65G 17/08* (2013.01); *B21D 19/12* (2013.01); *B21D 51/2615* (2013.01); *B31B 1/00* (2013.01); *F27D 3/00* (2013.01); *B31B 2201/02* (2013.01); *B31B 2203/062* (2013.01)

(58) Field of Classification Search
CPC ...... F27D 3/00; B21D 51/2615; B21D 19/12; B31B 1/00; B65G 17/08
USPC ......... 414/157; 198/861.1, 819, 836.3, 836.4, 198/817
See application file for complete search history.

(56) References Cited

U.S. PATENT DOCUMENTS

| | | | | |
|---|---|---|---|---|
| 4,140,457 A * | 2/1979 | Miki et al. | .................... | 425/384 |
| 4,428,723 A * | 1/1984 | Thiel et al. | ................. | 425/324.1 |
| 4,780,040 A * | 10/1988 | Petersen | ........................ | 414/157 |
| 5,749,698 A * | 5/1998 | Miyoshi | ........................ | 414/800 |
| 5,813,518 A * | 9/1998 | Kirker | ........................... | 198/817 |
| 5,871,325 A * | 2/1999 | Schmidt et al. | ............... | 414/150 |
| 6,142,293 A * | 11/2000 | Ozawa et al. | ................. | 198/837 |
| 6,688,458 B2 * | 2/2004 | Prentice et al. | ............. | 198/502.2 |
| 7,132,065 B2 * | 11/2006 | Allen et al. | ..................... | 264/2.7 |
| 7,316,308 B2 * | 1/2008 | Ullrich et al. | ................. | 198/817 |
| 7,361,008 B2 * | 4/2008 | Crepaz | .......................... | 425/397 |
| 7,748,520 B1 * | 7/2010 | Helgerson et al. | ........ | 198/781.03 |
| 7,810,635 B2 * | 10/2010 | Kim et al. | ..................... | 198/817 |
| 2005/0098412 A1 * | 5/2005 | Uh et al. | ........................ | 198/817 |

* cited by examiner

Primary Examiner — Kaitlin Joerger
(74) Attorney, Agent, or Firm — John R. Benefiel

(57) ABSTRACT

A thermoformer apparatus has sheet supporting rails which are divided into sections hinged together to facilitate widening of the spacing between the rails with adjuster drive mechanism as the sheet moves through an oven to eliminate sagging of the sheet as it becomes heated. Thermoformer chains are driven by a pair of independently operable servo motors each associated with a respective thermoformer chain.

6 Claims, 5 Drawing Sheets

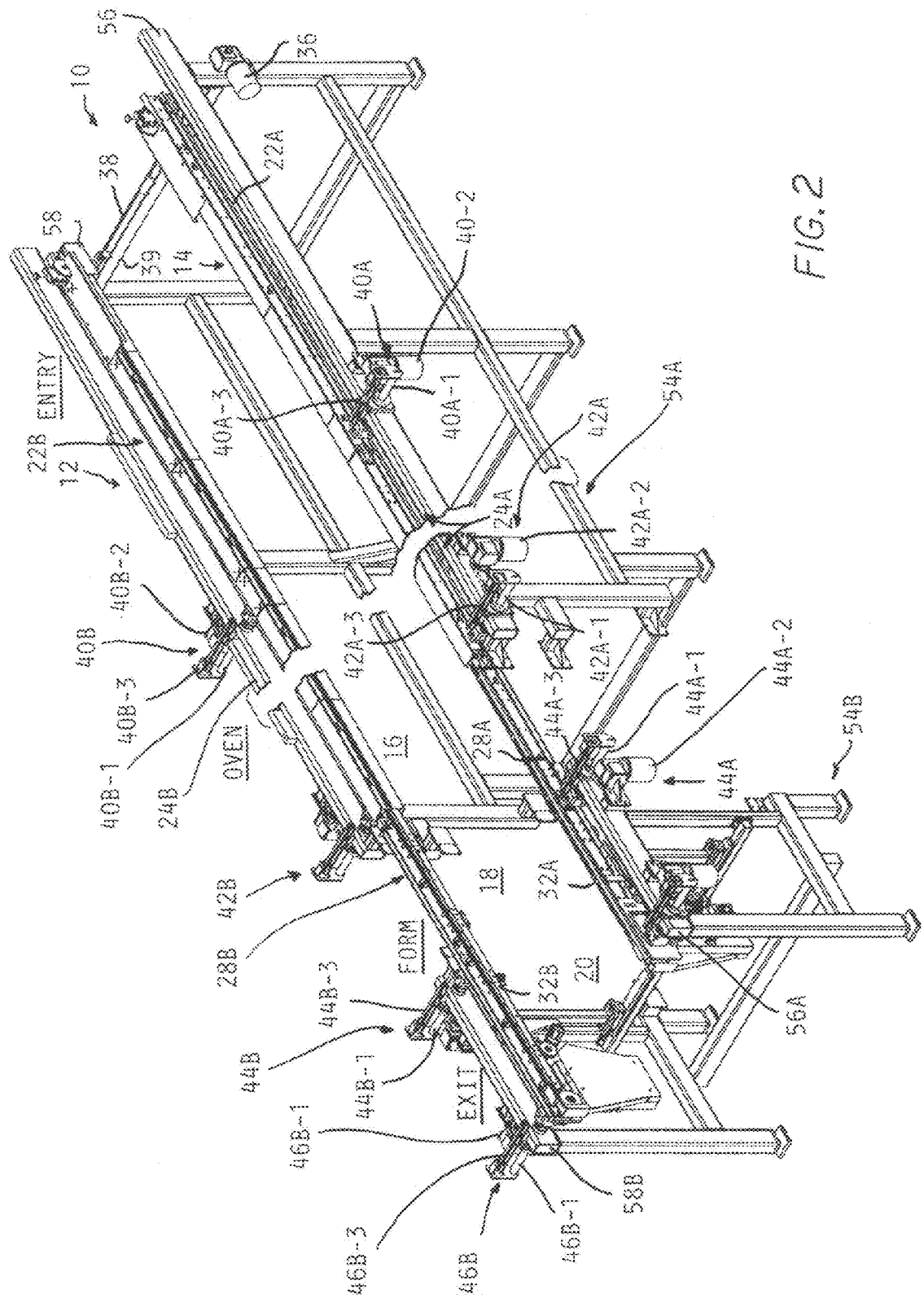

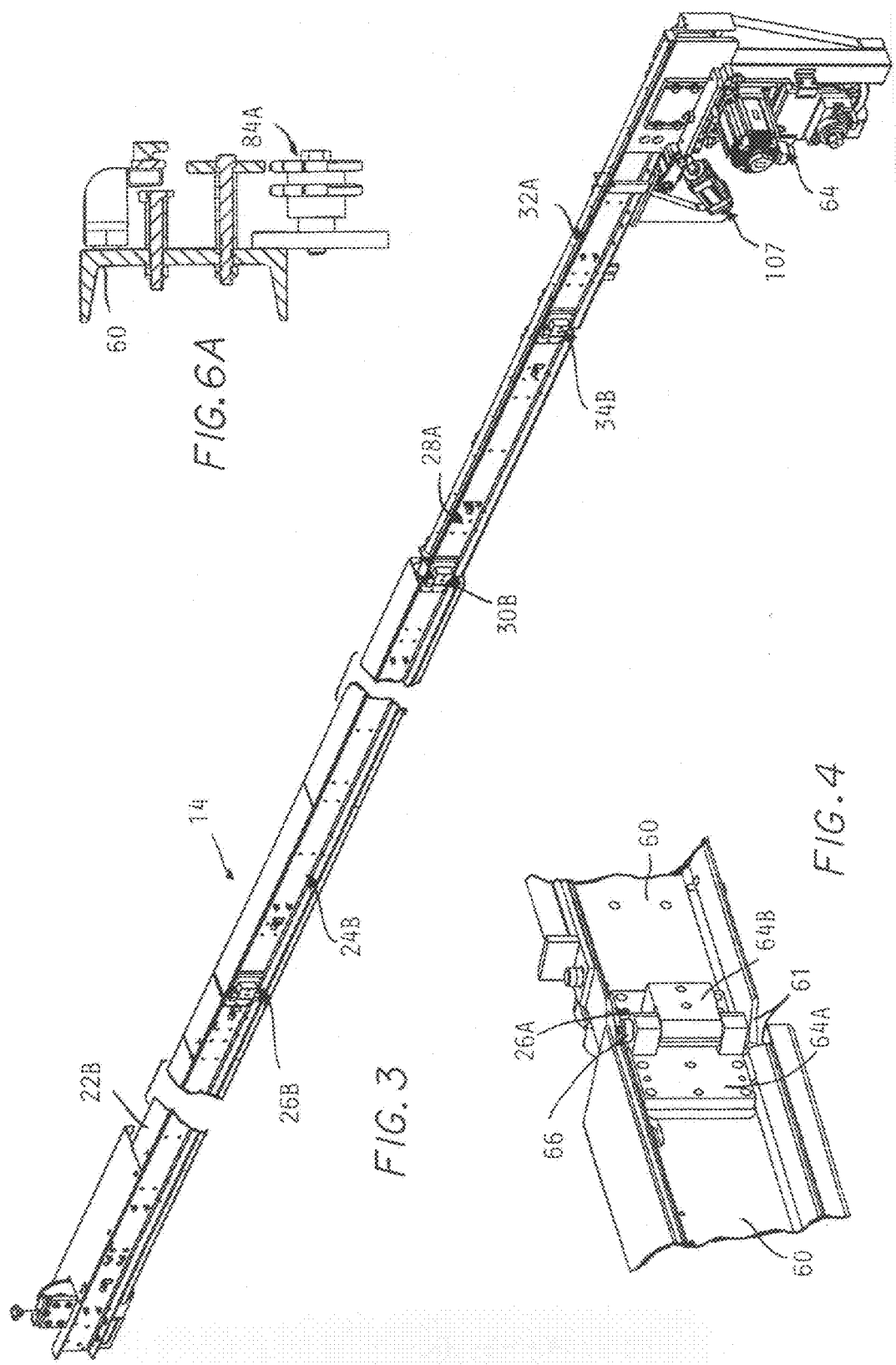

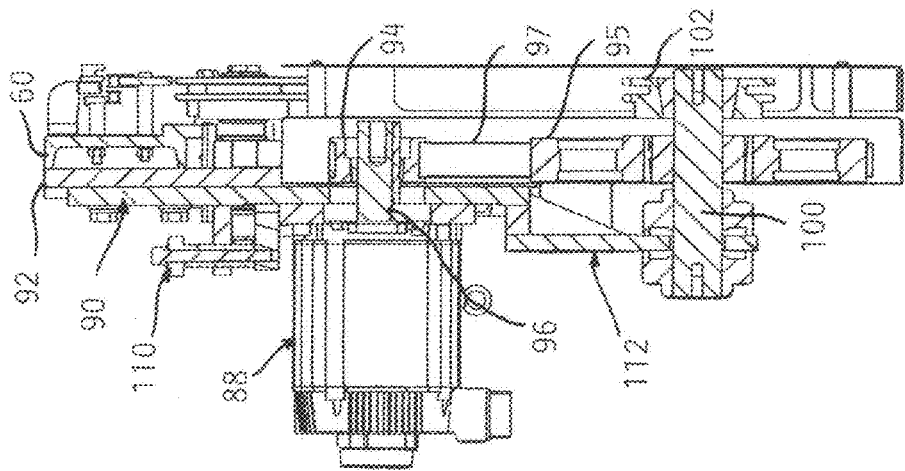
FIG. 6
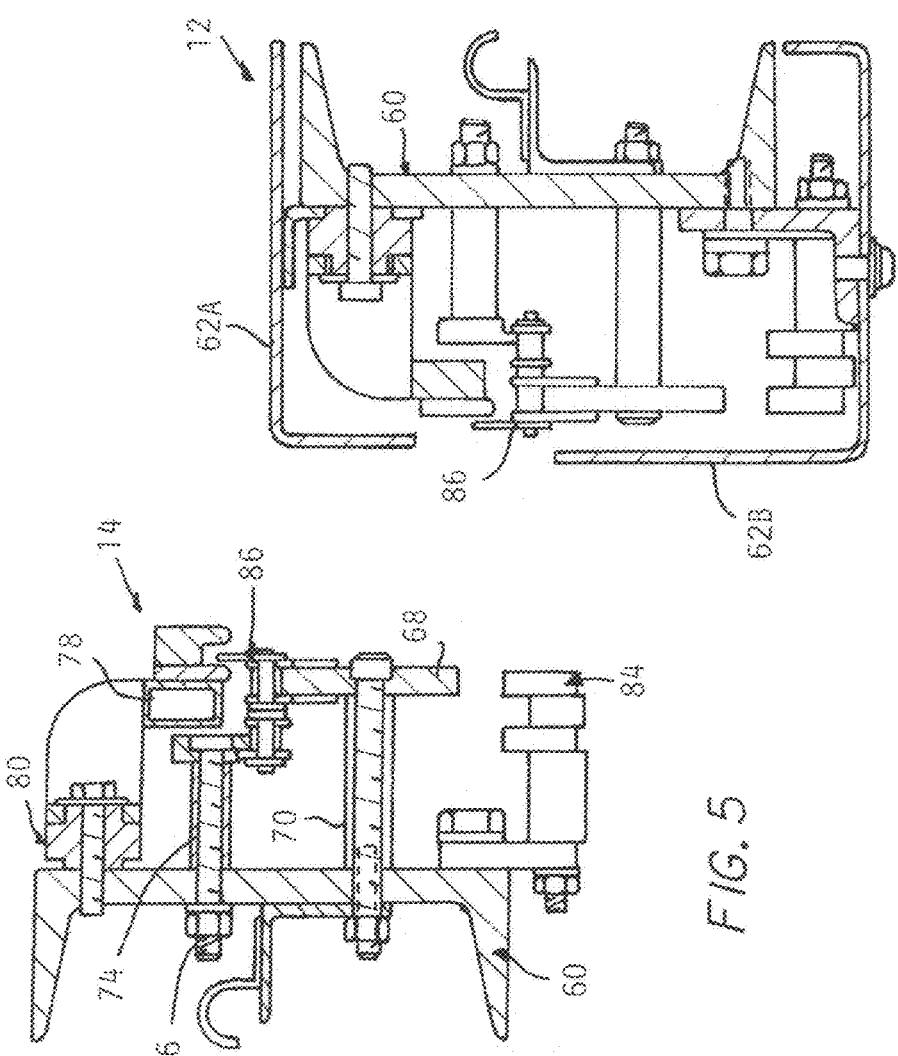
FIG. 5A
FIG. 5

RAIL SYSTEM FOR THERMOFORMER WITH DUAL MOTOR CHAIN DRIVE

CROSS REFERENCE TO RELATED APPLICATIONS

This application claims the benefit of U.S. provisional patent application No. 61/686,386 filed on Apr. 4, 2012 and U.S. provisional patent application No. 61/803, filed on Mar. 20, 2013.

BACKGROUND OF THE INVENTION

This application concerns roll fed thermoforming machines of a well known type which mold products into plastic sheet material fed into the machine from a roll. The plastic sheet is advanced by movement of a pair of drive chains while being supported by a pair of spaced apart parallel rails extending through an oven to heat the plastic sheeting and thence into a forming station where product is molded into the heated sheet by pressure and/or vacuum.

After a cooling interval, the sheet is advanced out of the thermoformer and into a trimmer where the products are cut from the sheet.

Such thermoformers are typically adjustable to be adapted to different sheet widths by moving the rails to the spacing required for a particular sheet width.

A complication is created by the growth in width of the plastic sheeting when heated and also by a tendency of the sheet to sag as the plastic material is softened by the oven heating.

Such sagging can interfere with the molding process so that in the past a portion of the rails were driven apart laterally to eliminate any sag. This motion is resisted by the sturdy rails which must be bent in the region of the oven to produce that lateral movement.

This makes precision fine adjustments difficult due to the resistance to bending of the rails and requires powerful motors to carry out. It can also cause binding in the adjustment mechanism. The long lengths of channel needed for the rails increases the cost of fabricating the machines.

The plastic sheet is engaged by a pair of recirculating chains each supported by one of the rails, which chains have sticker tips which penetrate the plastic sheet on each side to cause the sheet to be moved with the chains as they move along the rails. Both chains have traditionally been driven by a single large electric motor which simultaneously drives a pair of spaced sprockets by means of an indexing system including a common shaft connecting the sprockets.

This insures that each side of the sheet is driven precisely equally to keep the sheet straight with respect to the rails in order to be oriented properly with the molding tooling.

The presence of the cross shaft hinders changing tools and the indexing system itself requires substantial maintenance. A large motor must be used to power driving both chains, and this slows the response time of the drive system.

The drive cross shaft must also be configured to accommodate sheet width adjustments increasing the complexity of the chain drive.

It is an object of the present invention to provide an improved rail system and chain drive to eliminate the difficulties presented by the long length rails in adjusting the rail spacing at points long their length to keep the plastic sheet flat as it is heated.

It is another object of the present invention to simplify the chain drives to eliminate the indexing components and improve its performance.

SUMMARY OF THE INVENTION

The above objects of the present invention are achieved by configuring each of the support rails as an assembly of rail sections, with an end to end aligned series of four rail sections having adjacent ends thereof hinged together. The hinges are configured to be able to strongly resist vertical and torsional deflections while freely allowing lateral rail section motion at the hinges. Each end of the rail sections are controllably positionable in an in and out direction lateral to the side by a respective adjuster drive mechanism, each adjuster drive mechanism including a servo motor which is electronically controlled in coordination with all of the other servo motors of the other adjuster drive mechanisms. The precise position of each rail section hinged end is tracked by the use of linear movement transducers included in each of the adjuster drive mechanisms.

Each rail assembly is configured with pairs of rail sections normally parallel to each other at a spacing which can be varied to match a given sheet width, and a pair of rail sections which extend completely within a heating oven. The oven sections will typically be adjusted to be shallowly divergent with a spacing therebetween which increases within the oven to form a V, in order to pull the sides of the heated sheet apparatus to be maintained taut as the sheet is heated to avoid sagging as the heated sheet softens.

A pair of adjuster drive mechanisms with independently energized servo motors drive the exit rail sections of the rails to enable sheet width size adjustments but also allows movement of only one rail section to create skewing of the sheet to correct for unequal cooling of the sheet so as to be better aligned with trim tooling into which the formed sheet enters after exiting the thermoformer.

The chains are each driven by a respective servo motor smaller than the single motor of prior practice which are both electronically controlled independently to insure perfect coordination of the sprockets driving the respective chains, which smaller motors improves the response times of the chain drive, and to eliminate the cross shaft formerly used, to thereby simplify the chain drives. This also opens up the area at the exit end of the thermoformer for easier tool changing.

This also eliminates variations between the respective sprockets' rotation due to wind up of the cross shaft formerly required.

DESCRIPTION OF THE DRAWING FIGURES

FIG. 2 is a pictorial view of a rail system in accordance with FIG. 1.

FIG. 3 is a pictorial view of one of the rail assemblies included in the rail system shown in FIG. 2.

FIG. 4 is an enlarged view of a portion of the rail assembly shown in FIG. 3 showing details of the hinge connection between adjacent rail sections.

FIG. 5 is a view of a section taken through one of the rails located in the oven section.

FIG. 5A is a view of a section taken through the other one of the rails located in the oven section.

FIG. 6 is a view of a section taken through one of the rails located in the form section.

FIG. 6A is a view of a section taken through the other rail.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
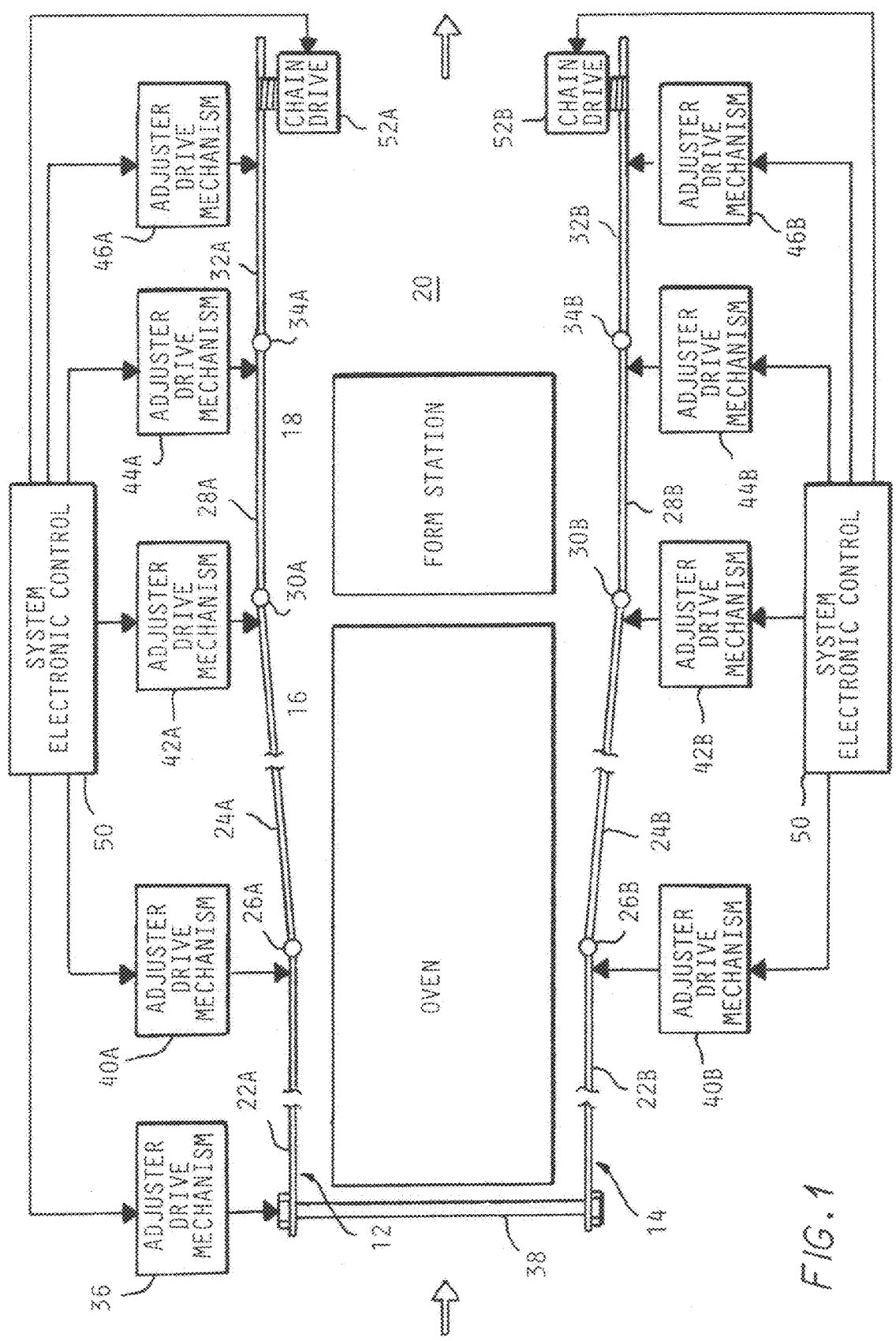
FIG. 1 is a diagrammatic representation of a thermoformer rail system according to the invention.

Referring to the drawings and in particular FIG. 1, a rail system 10 for a thermoformer apparatus is shown in diagrammatic form which includes a pair of spaced apart rails 12, 14.

The rails 12, 14 support a sheet of plastic fed off a roll (not shown) which is advanced into an entry end of the system (to the left in FIG. 1). The sheet passes into an oven 16 where the sheet is heated in preparation for forming in form station 18, which is located the necessary tooling for molding products into the heated sheet. The sheet with the products molded therein passes out of the forming station into an exit/cooling section 20 and is thereafter discharged into a trim station (not shown) where the formed products are cut from the sheet.

This overall arrangement is well known in the art.

Support rails are conventionally configured as continuous lengths of steel such as heavy C channels since the weight of the sheet when sagging can exert considerable twisting force on the rails which must be resisted in order to hold the sheet flat. The resistance to vertical deflections over the long lengths of the rails also necessitates a heavy support member.

Since the heated sheet sags, it is necessary to stretch the rails at some point within the oven where sag would begin to occur to properly carry out the thermoforming process.

Conventionally, adjuster drive mechanisms engage with the C channels to bend them out where necessary to stretch the heated sheet.

It requires considerable force to bend the sturdy members making up the rails, and precision bending is difficult to achieve. Also the bends in the rails can't be located precisely where the rail spacing is most desirably increased to properly stretch the heated sheet.

The long length rail members are also difficult and expensive to fabricate and to work with at assembly.

The rail spacing must also be adjustable to accommodate different sheet widths, and this adjustment capability must accommodate the rail bending process referred to above occurring during operation of the thermoformer.

According to the present invention, the rails are configured in a series of separate sections which are hinged together with sturdy hinges which maintain the overall torsional and vertical stiffness of each rail to resist the twisting forces exerted by the catenary of the sagging heated sheet or web, as well as the weight of the rails members themselves and of a long length of sheet material.

This configuration comprises two entry rail sections 22A, 22B, connected to two longer oven sections 24A, 24B, the two sections 22A, 24A, and 22B, 24B hinged together end to end at 26A, 26B, of a combined length substantially corresponding to the length of the oven 16.

The two sections 28A, 28B after the oven sections are matched in length to the forming station 18, and are hinged together end to end at 30A, 30B to the second of the oven sections 24A, 24B.

The exit sections 32A, 32B are hinged together at 34A, 34B end to end with the forming station sections 28A, 28B.

An entry end width adjustment is carried out with a single servo motor adjuster drive 36 rotating a threaded shaft 38 having sections threadedly engaging components on the entry side ends of sections 22A, 22B to simultaneously move then so as to spread them apart or draw them closer together to accommodate a particular sheet width.

Each rail section 22A, 22B, 24A, 24B, 28A, 28B, 32A, and 32B has an independently operable respective associated adjuster drive mechanisms 40A, 40B, 42A, 42B, 44A, 44B, and 46A, 46B just upstream of hinged connections 26A, 26B, 30A, 30B, 34A, 34B and the respective exit ends of the rail sections 32A, 32B.

The adjuster drive mechanisms 40A, 40B are of a similar design to that of adjuster drive previously used with continuous rails, although utilizing smaller electric servo motors, and are controlled by a system electronic control 50 to move in coordination all of the respective sections to adjust the rail section spacings to different sheet widths and at the same time to also allow both widening of the rail spacing and to create a V shape with the two oven sections 24A, 24B matched to the stretching of the sheet web, to eliminate sag.

In addition, according to the present invention a chain drive comprising two independently operable electric servo motors 52A, 52B are employed each driving a respective one of the chains rather than a single motor driving an associated mechanical connection to both of the two chain sprockets. The chain drives are located at the exit end of the sections 32A, 32B, as will be described below.

FIG. 2 shows that the rail system 10 is supported on a fixed framework 54A, 54B including upper frame members 56, 58 extending along respective rails 12, 14.

Each of the adjuster drive mechanisms 40A-46B includes a power screw 40A-1, 46B-1 which passes through a frame member 56, or 58 and is attached to a respective rail section 22A-32B to support these sections on the frame members 56 or 58.

The entrance end has an adjuster drive 36 rotating a shaft 38 received in frame cross member 39 supporting one end of the first sections 22A, 22B.

The power screws 40A-1-46B-1 are each driven by a respective servo motor 43A-2-46B-2, and a distance transducer 40A-3-46B-3 provides a signal corresponding to the position of each power screw to enable setting of the position of the associated rail section ends 22A-32B. This arrangement is generally known in the context of single piece rail systems.

FIGS. 3 and 4 depict rail 14 showing further details of the rail construction common to both rails 12, 14.

The rails 12, 14 are comprised of sections of C channels 60 included in each rail section 22A-32B. The C channels 60 have angled ends at 61 to allow the hinging movement between connected ends of the sections.

Over the sections upstream from the forming stations, various covers 62 are installed over the C channels 60.

The hinges 26A-34B are of heavy construction to maintain torsional and vertical rigidity having interleaved heavy plates 64A, 64B, joined with a hinge pin 66.

A locking bar (not shown) may be installed over each hinge 26A-34B to prevent pivoting and so to allow easier installation of the rail sections 12, 14, after which the locking bar would be removed.

FIGS. 5 and 5A show further details of the rails 12, 14 in which a lower chain slide bar 68 is held spaced from the web of C channel 60 with a spacer 70 and an upper chain slide 72 is held similarly with a spacer 74 and a shoulder bolt 76.

A coolant tube 78 for cooling the sheet edges is mounted by a bracket 80 and held down thereby.

A chain sag support 84 is mounted to receive the return run of the chain 86 also mounted to the C channel 60.

FIG. 5A also shows mounting of the upper and lower covers 62A, 62B to the C channels 60.

FIG. 6 shows the chain drive for one side of the rail system, the other side chain drive being similar. This includes an electrical servo motor 88 mounted by a plate 90 and bracketry 92 to a C channel 60.

A reducer belt sheave 94 is driven by the motor output shaft 96 with a toothed belt 97 engaged thereby to drive a large diameter belt sheave 95 on a shaft 100 also mounted to fixed structure.

Figure 7:
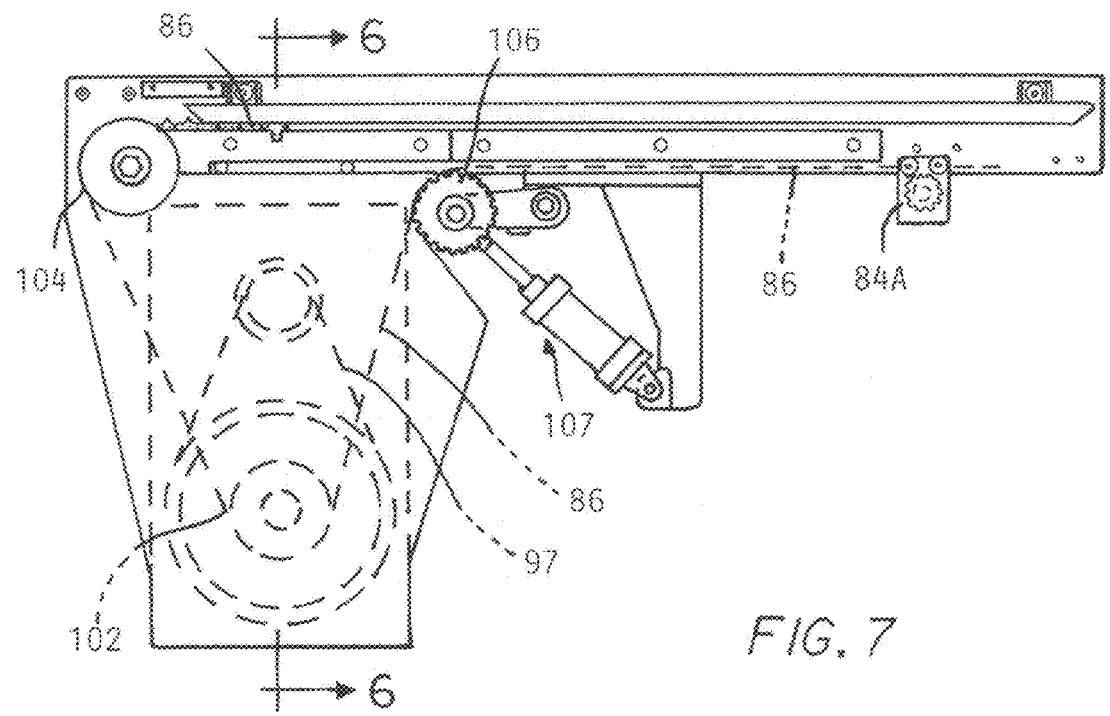
FIG. 7 is an elevational view of the discharge end of the rail system showing one of the chain drives.

The shaft 100 also has a chain sprocket 102 located well below a sprocket idler 104 (FIG. 7) around which the upper chain run passes and a redirection sprocket 106 of a chain tensioner 107 (FIG. 6A) redirecting the chain 86 while maintaining tension along the lower run. Antisag sprockets 86 are arranged to support the lower run of the chain 86, all in the manner well known in the art.

Adjusters 110, 112 are also provided to provide proper belt engagement with the sheaves 94, 95 in the well known manner.

Figure 8:
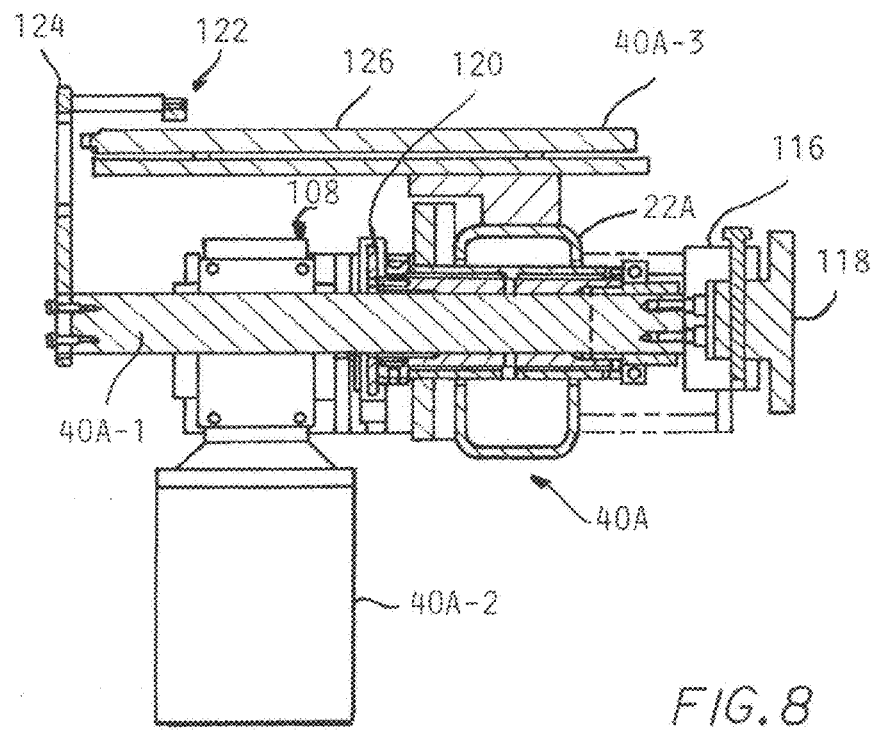
FIG. 8 is a partially sectional view through one of the adjuster drive mechanism depicted in FIGS. 1 and 2.

The adjuster drives 40A-46B are generally known in the art, and certain details of a typical drive 40A are shown in FIG. 8. The power screw shaft 40A-1 is rotated by a motor driven worm gearbox 108 rotating a sprocket 120 clamped to the screw shaft 40A-1. The screw shaft 40A-1 extends through a frame member 22A and has plates 116 and plate 118 attached to the end which are in turn is connected to a C channel 60.

A distance transducer 122 includes a plate 124 and a magnet plate 124B which moves back and forth with the screw shaft 40A-1 creating an electrical signal corresponding to the travel sensed to allow setting of the C channel portion which is connected to the screw shaft 40A-1.

Accordingly, the precise spacing of each rail section may be easily set in coordination with the other sections, enabling sheet size adjustments as well as moving the ends of rail sections 24A, 24B to create a V section as needed to compensate for heating of the sheet in the oven.

The use of two smaller servo motors for the chain drives leads to better response times and simplifies the drive to reduce maintenance and leave the exit end clear to facilitate tool changes, and eliminate errors due to wind up of a cross shaft.

The invention claimed is:

1. In a thermoforming apparatus of a type including a pair of longitudinal rails for supporting sheet material to be thermoformed, said rails extending from an entry end adapted to receive a sheet of plastic to be loaded therein, through an oven adapted to receive said sheet driven thereinto by a sheet drive mechanism included in said thermoforming apparatus to heat the same, through a form station having tooling located therein adapted to form product into said heated sheet, and a discharge/cooling end discharging sheet with product formed therein, the improvement comprising:
    a series of hinges along each rail connecting a series of end to end sections together forming each of said rails, said sections connected together by said hinges allowing relative pivoting motion of said connected sections of each rail.

2. The thermoforming apparatus according to claim 1 wherein a pair of first rail sections are located adjacent said entry end and extending into said oven, second rail sections extend from the respective ends of said first rail sections and through said oven, with a hinge connecting said first and second rail sections end to end allowing pivoting motion therebetween; a pair of third rail sections extended from the ends of said second rail sections, with a hinge connecting end to end each of said second and third rail sections; and a pair of fourth rail sections extending end to end from said third rail sections with a hinge connecting each of said third and fourth sections end to end.

3. The thermoforming apparatus according to claim 2 further including an adjuster drive mechanism adjacent each of said hinges operable to produce controlled movement of each hinge towards and away from the corresponding hinge on an opposite rail to thereby enable varying the spacing between said rails at said hinge locations.

4. The thermoforming apparatus according to claim 3 further including a single adjuster drive mechanism engaging said rails at locations adjacent the entry end of said rails to enable shifting of the spacing at said entry end therebetween.

5. The thermoforming apparatus according to claim 1 further including a pair of sheet carrying thermoformer chains each mounted for recirculating movement on a respective one of said rails, and a pair of independently operable chain drives including a pair of servo motors each driving a respective thermoformer chain.

6. The thermoformer apparatus according to claim 2 further including a pair of independently operable adjuster drive mechanisms engaging said cooling/discharge rail section adjacent the ends thereof enabling size adjustments as well as skew corrections of the position of said sheet.

\* \* \* \* \*